Feb. 13, 1968  C. T. HEWSON  3,368,352
GAS TURBINE ENGINES
Filed Jan. 7, 1966  4 Sheets-Sheet 1
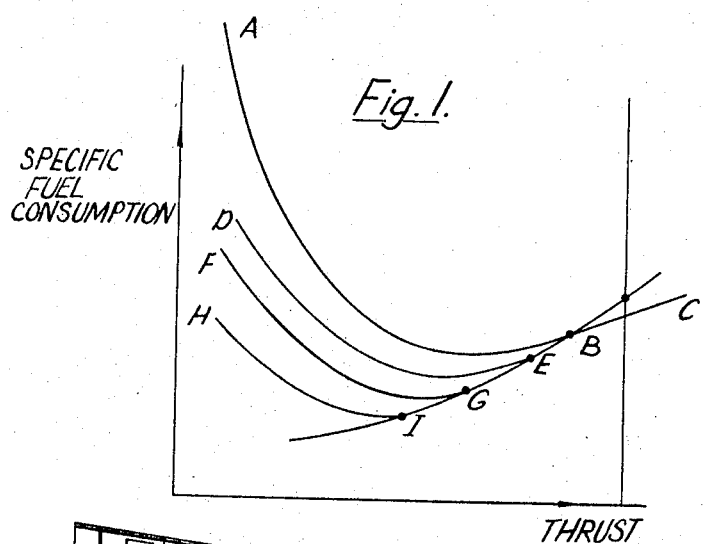
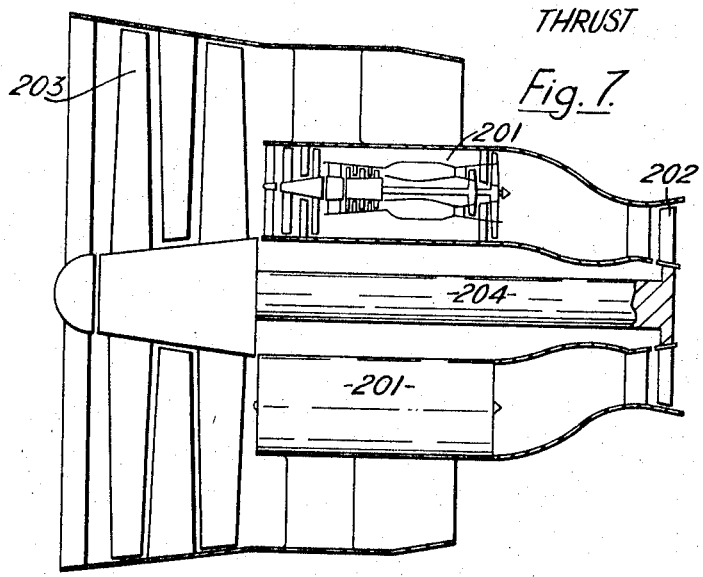
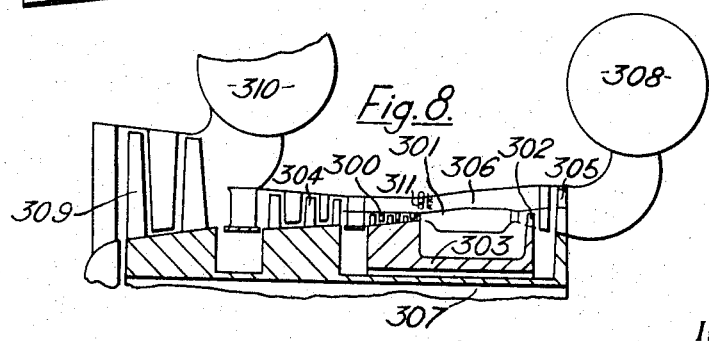
Inventor
Colin Taylor Hewson
By
Cushman, Darby & Cushman
Attorneys

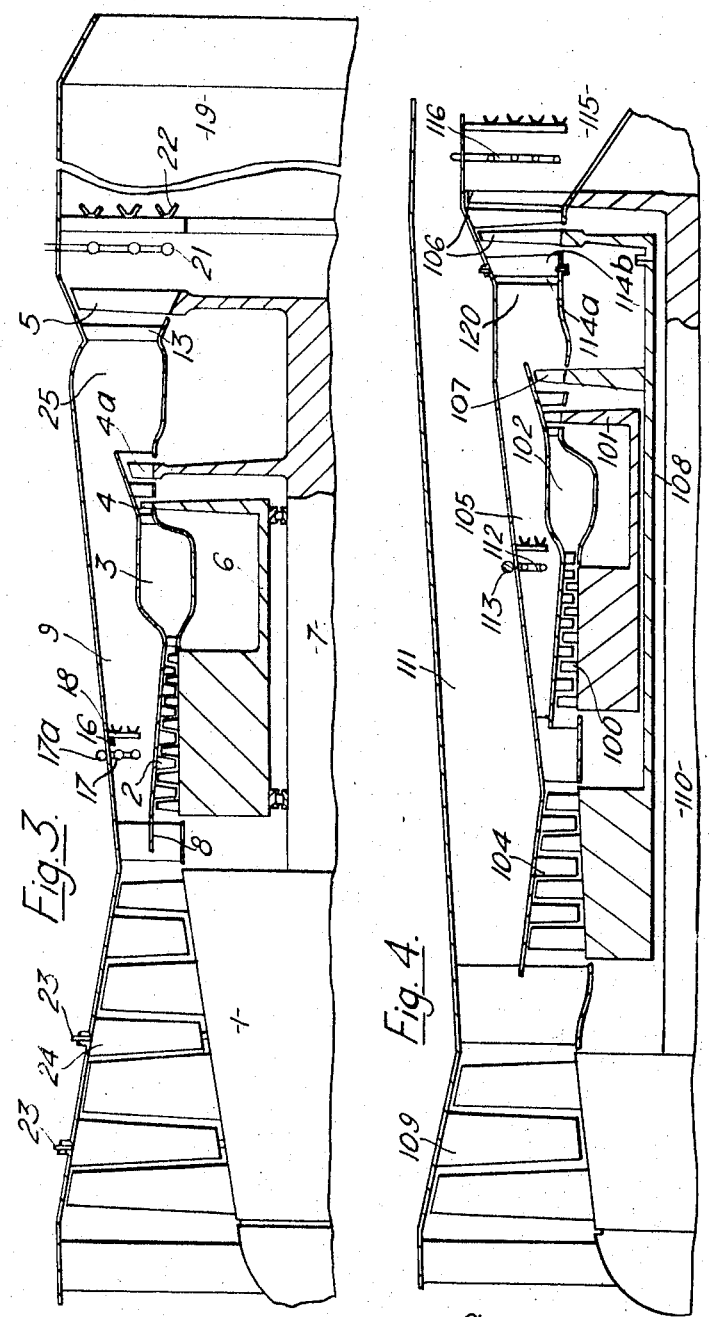

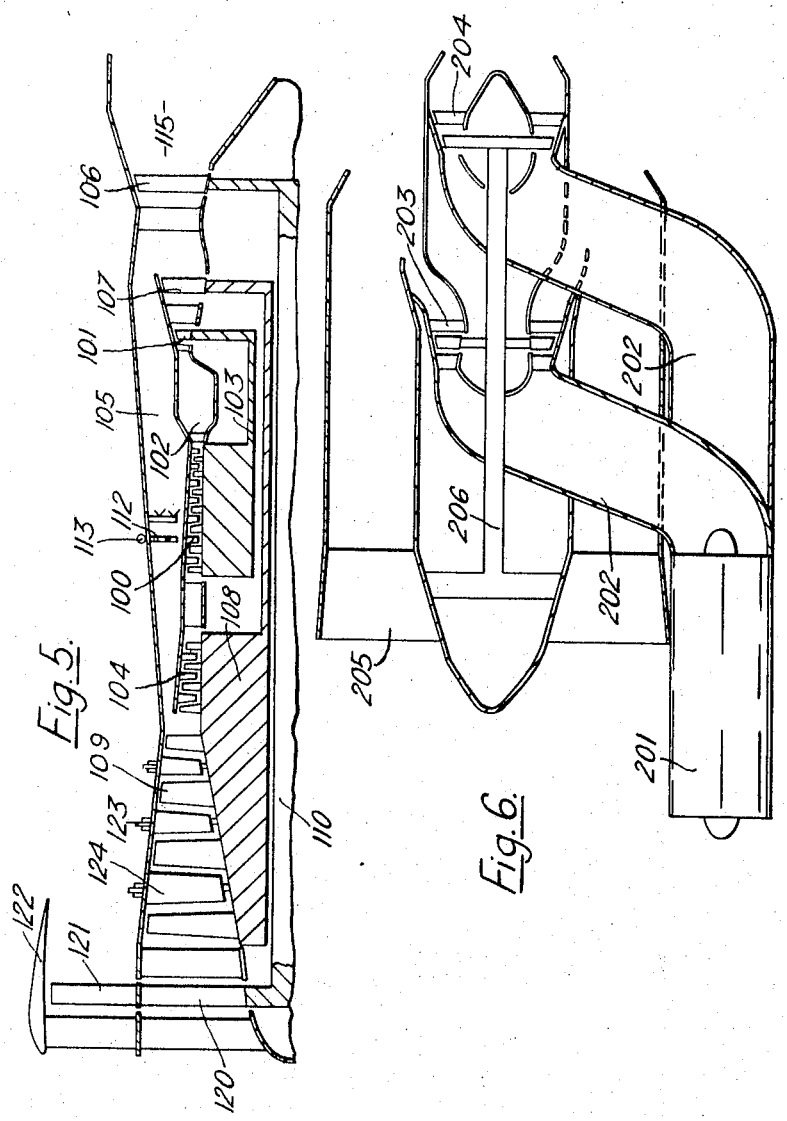

3,368,352
GAS TURBINE ENGINES
Colin Taylor Hewson, Duffield, England, assignor to Rolls-Royce Limited, Derby, England, a British company
Filed Jan. 7, 1966, Ser. No. 519,334
Claims priority, application Great Britain, Jan. 30, 1965, 4,204/65
20 Claims. (Cl. 60—224)

ABSTRACT OF THE DISCLOSURE

A by-pass gas turbine jet propulsion engine in which the by-pass stream passes through the L.P. turbine and the by-pass duct contains combustion equipment which may be inoperative or operative in conjunction with the main combustion equipment to provide a variable by-pass ratio effect. Variable nozzle guide vanes are provided upstream of the L.P. turbine. Afterburning may be provided in conjunction with this engine arrangement with little or no nozzle area variation.

---

The present invention relates to gas turbine jet propulsion engines and relates more particularly to gas turbine jet propulsion engines of the by-pass type.

By a by-pass engine is meant an engine having a high pressure system comprising compressor means, combustion equipment and turbine means in flow series, the turbine means being arranged to drive the said compressor means, there being at least one further compressor means producing an air flow, at least part of which air flow is arranged not to pass through the said high pressure system.

The term compressor means throughout this specification may be taken to include a fan.

Modern day aircraft especially in the military field are being designed to be capable of a number of roles and it would obviously be an asset to have an engine which is flexible enough to provide the required thrust for a variety of roles with the minimum loss of economy in fuel consumption and weight.

Is is well known that a by-pass engine designed to give a certain maximum thrust, say for take-off, will have a better fuel consumption when throttled back to a lower thrust value, than a pure jet engine, designed to give the same maximum thrust, without reheat, when throttled back to the same lower thrust value. The higher the by-pass ratio the greater the saving in fuel consumption as compared with the pure jet case.

It is one object of this invention therefore to provide an engine which is versatile and which has a variable effective by-pass ratio.

For the purposes of this specification the effective by-pass ratio of an engine at any instant is the ratio of the mass of air flowing through the engine and which has been compressed by an engine compressor means, and in which no fuel is burned, to the mass of air flowing through the engine and which has been compressed by an engine compressor means, and in which fuel is burned.

According to the present invention there is provided a by-pass gas turbine engine having a high pressure system comprising in flow series a first compressor means, first combustion equipment and a first turbine means drivingly connected to the first compressor means, second compressor means, second turbine means disposed downstream of the first turbine means, said second turbine means being drivingly connected to a compressor means of the engine, at least a portion of said second turbine means being in flow series with the first turbine means, ducting to convey at least a portion of the air compressed by the second compressor means around the said high pressure system to the second turbine means, second combustion equipment disposed in the said ducting to enable fuel to be burned in said portion of the air before it is mixed with the hot gases from the H.P. system, and control means whereby the further combustion means may be selected to be operative or non-operative thereby varying the effective by-pass ratio of the engine.

In the preferred embodiments of the invention the said second turbine means is drivingly connected to the said second compressor means and part of the second compressor means is in flow series with the high pressure system.

In alternative preferred embodiments the said second turbine means is drivingly connected to a further compressor means and may be drivingly connected to both the second compressor means and the further compressor means.

Where a further compressor means is provided it may be in the form of a low pressure compressor upstream of the second compressor, or it may be in the form of a front or aft fan on the engine. At least part of the further compressor means may be arranged to provide a stream of compressed air which by-passes the second compressor means and the high pressure system, and this air stream produced by the further compressor means may be directed to nozzles for vertical takeoff aircraft.

The ducting which conveys air between the second compressor and the second turbine is preferably of annular form and surrounds the high pressure system.

When the second combustion means is in operation conditions in the engine jet pipe may become such as to cause the second compressor means to surge. Hence means may be available either to vary the nozzle areas, to increase the pressure upstream of the nozzles, or to decrease the mass flow through the nozzles, if the temperature upstream of the second turbine means is to be increased further.

The said means may be present either singly or in combination. The means for varying the nozzle areas may be nozzle guide vanes which are pivotable either in whole or in part about their longitudinal axes. The means to decrease the mass flow through the nozzles may comprise valve means and a conduit to bleed a portion of the air flowing through the ducting around the nozzles and into the engine jet pipe. When the engine is installed in an aircraft the said portion of air may be used for flap blowing, for cooling purposes or to duct it to nozzles or fans for VTO. Means may be provided for varying the angles of the stator vanes of the second compressor means whereby the pressure upstream of said nozzle guide vanes may be varied.

The said second turbine means may comprise a turbine in flow series with the first turbine and having extended blade portions which project into the ducting and into the flow path of the air therein. The gases in the ducting may pass through the said extended blade portions as a separate stream with splitters being provided to keep the streams separate while in contact with said extended blade portions, or means may be provided whereby the static pressures of the gas stream in the ducting and the gas stream emerging from the first turbine means are allowed to become substantially equal, in which case the splitters would be dispensed with. The pressure equalization may take place with or without substantial mixing of the two gas streams and when mixing is allowed to take place a pressure balancing turbine or intermediate pressure turbine must be disposed in the high pressure stream upstream of the mixing zone in order that the total pressures of the two streams become substantially equal prior to mixing. Further burning may take place in the mixed stream.

Means are preferably provided for afterburning in the engine jet pipe whereby burning may take place in the ducting using the second combustion means with an engine final nozzle of constant area. Alternatively means may be provided to vary the area of the engine final nozzle.

In a further embodiment one or more by-pass engines of the type described are used together to drive one or more second turbines which in turn drive further compressor means.

The invention will now be described in more detail, merely by way of example, with reference to the accompanying drawings wherein:

FIGURE 1 is a set of curves which show the relationship between thrust, specific fuel consumption and by-pass ratio. The curves show only an approximate relationship and are not calculated to scale.

FIGURE 3 shows a variation of the engine of FIGURE 2.

FIGURE 4 shows an engine in which a second stream of air is produced which by-passes the high pressure system.

FIGURE 5 shows an engine similar to FIGURE 4 and in which the second by-pass stream is produced by a front fan.

FIGURE 6 shows an engine having two by-pass engines driving a front fan.

FIGURE 7 shows an alternative arrangement of FIGURE 6.

FIGURE 8 shows an engine which has swivelling nozzles for VTO.

Figure 2:
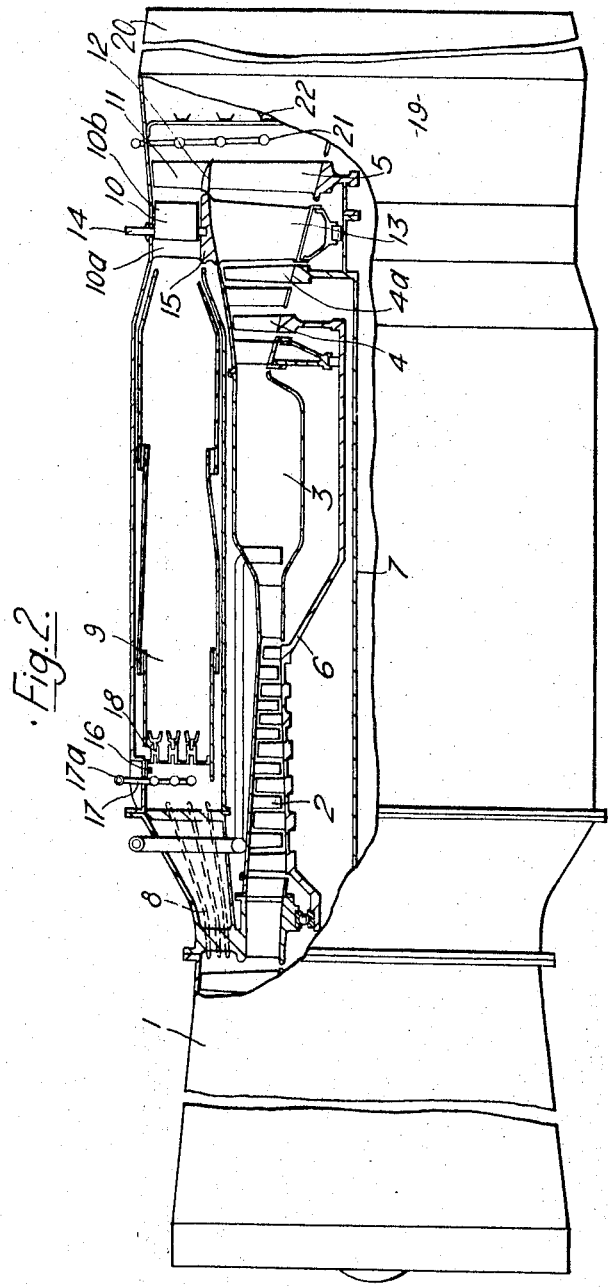
FIGURE 2 shows an engine according to the present invention having a single duct by-passing the high pressure system.

Referring now to FIGURE 1 there are shown curves of thrust plotted horizontally, against specific fuel consumption vertically. Curve BEGI shows the variation of thrust and S.F.C. for engines of the same mass flow, pressure ratio and combustion temperature in the high pressure system, and the curves BA, ED, GF and IH illustrates the variation in thrust and S.F.C. when throttling engines of various by-pass ratios back from the conditions of equal mass flow, pressure ratio and combustion temperature shown in curve BEGI. Curve BA is for a pure jet engine, i.e., an engine of zero by-pass ratio, curve ED is for an engine of by-pass ratio 1, curve GF represents an engine of by-pass ratio 2 and curve IH represents an engine of by-pass ratio 3. The line BEGI, therefore, shows the effect on thrust and fuel consumption when throttling an ideal infinitely variable by-pass ratio engine from a high thrust condition to a low thrust condition, and comparing this curve to curve BA shows the savings in fuel consumption which could be made if an engine could be designed to have a fully variable by-pass ratio.

In practice a fully variable by-pass ratio engine has never been achieved but the present invention provides a means whereby an engine may be produced having some of the characteristics of a variable by-pass ratio engine.

Some of the many applications of the versatile engines of the present invention will now be particularly described. The terms "high pressure," "intermediate pressure" and "low pressure" will be abbreviated to H.P., I.P. and L.P. respectively.

FIGURE 2 shows an engine having an L. P. compressor 1, an H.P. compressor 2, combustion equipment 3, an H.P. turbine 4, and a second or L.P. turbine 5. Although the H.P. turbine has two stages the L.P. turbine 5 is regarded as the second turbine means The H.P. turbine is arranged to drive the H.P. compressor 2 through a shaft 6, and the L.P. turbine is arranged to drive the L.P. compressor 1 through the shaft 7.

The turbine 4a is an I.P. or pressure balancing turbine which drops the pressure of the gases leaving the H.P. turbine 4 to more nearly match the pressure of the gases in the duct 9 before they enter the L.P. turbine 5.

A portion of the air flowing through the L.P. compressor 1 passes through splitters 8 and into a by-pass duct 9. From the by-pass duct 9 the said portion of air passes through nozzle guide vanes 10, to a portion 11 only of the second turbine 5. The said portion 11 in this embodiment forms an extension of the blades of the L.P. turbine 5.

The nozzle guide vanes 10 are mounted radially outwardly of the nozzle guide vanes 13 between the turbine 4a and the L.P. turbine 5. The leading edge portion 10a of the nozzle guide vane is fixed to the engine casing and supports the L.P. shaft bearing assembly. The variations in nozzle guide vane area are provided by rotation of the trailing edge portion 10b.

Actuating means 14 are provided outside the engine for rotating the trailing edge portion 10b of the nozzle guide vanes 10.

The by-pass stream from the duct 9 and the exhaust gas stream from the H.P. turbine are prevented from mixing by splitted members 15 disposed radially between the nozzle guide vanes 13 and the nozzle guide vanes 10. The turbine 11 also carries splitters 12 to maintain the two streams as separate streams.

A fuel manifold 17 is provided at the upstream end of the by-pass duct 9 for burning additional fuel in the by-pass air. The fuel is supplied from the manifold 17 upstream of stabilizing gutters 18 and igniters 16 are provided downstream of the manifold 17 to initiate the combustion of the fuel. The igniters 16 may be electrically operated or may comprise means to supply a quantity of pyrophoric fuel which ignites on contact with the air. A control means which comprises a valve 17a is disposed in the fuel line 17 to select the combustion equipment to be operative or non-operative.

The gases passing through turbines 5 and 11 pass into a jet pipe 19 downstream of the said turbines, where they are allowed to mix before passing to atmosphere through a fixed area final nozzle 20.

Further fuel supply means 21 and combustion stabilizers 22 are provided in the jet pipe whereby the gases may be reheated before passing through the final nozzle.

FIGURE 3 discloses a variation of the engine of FIGURE 2 in which a space 25 is provided for the by-pass stream and the stream issuing from the H.P. system to mix before the streams pass through the second turbine 11.

The pressure balancing turbine 4a disposed in the H.P. stream upstream of the mixing zone 25 ensures that the total pressures of the two gas streams become substantially equal prior to mixing. Further combustion equipment, not shown, may be provided to heat the mixed stream to enable maximum power to be extracted from the turbine 5.

The parts of the engine shown in FIGURE 3 which are identical to those shown in FIGURE 2 have been given the same reference numerals and thus the figure is not described in detail.

In this case the splitters 15 and 12 on the nozzle guide vane 13 and turbine blade 5 are removed and the whole length of nozzle guide vane 13 may thus be made variable. Alternatively a means 23 may be provided on the L.P. compressor to vary the stator vanes 24 thereof and this alternative construction is shown in the figure. The engine final nozzle area is also variable in this embodiment by means not shown. The modes of operation of the two engines shown in FIGURES 2 and 3, when installed in an aircraft, are similar and are described below.

In the low thrust mode of operation, fuel is burned only in the combustion equipment of the H.P. system and the engine approximates to a normal by-pass engine. In the high thrust mode of operation, fuel is burned in the by-pass duct and the engine assumes the characteristics of a pure jet engine (i.e., a by-pass engine of zero by-pass ratio). The L.P. turbine is now capable of producing either more power output at the same pressure ratio across it, or the same power output at a reduced turbine pressure ratio.

The expression governing the flow of gases through the nozzle guide vanes is $$\frac{M\sqrt{T}}{AP}$$

is approximately constant, where

M is the mass flow through the nozzle guide vane,
T is the temperature upstream of the nozzle guide vane,
P is the pressure upstream of the nozzle guide vanes and
A is the area of the gas passage defined by the nozzle guide vanes $$\frac{M\sqrt{T}}{AP}$$

will be constant when the nozzle guide vanes become choked.

By burning fuel in the by-pass duct the temperature upstream of the nozzle guide vanes is increased and therefore the value of $$\frac{M}{AP}$$

must decrease to maintain the constant or nearly constant value of $$\frac{M\sqrt{T}}{AP}$$

$$\frac{M}{AP}$$

may be reduced by (a) Reducing the mass flow M,
(b) Increasing the by-pass pressure P,
(c) Increasing the L.P. nozzle guide vane area A,
(d) A combination of *a*, *b* or *c*.

(a) may be achieved by respectively, bleeding a proportion of the by-pass flow either overboard or over the L.P. nozzle guide vane throat and back into the jet pipe. Since the high thrust mode of operation will frequently be used for aircraft take-off, the air bled off from the by-pass duct could well be used for blown flaps or other high lift devices to increase the aircraft lift.

(a) may also be achieved by providing an L.P. compressor with the capability of operating at a reduced flow at the same pressure ratio.

(b) may be achieved by providing the L.P. compressor with the capability of operating at an increased pressure ratio with the same flow. These two capabilities of the L.P. compressor may be achieved by providing the L.P. compressor with variable stator vanes.

(c) may be achieved by mechanically varying the nozzle guide vane throat area.

The potential increase in the power output from the L.P. turbine while duct burning is in progress can be used in two ways.

(1) to speed up the L.P. compressor so that it passes more flow at a higher pressure ratio, or
(2) to enable the jet pipe pressure to be raised at the same mass flow.

This leads to two different engine applications.

From (1) is derived an engine in which the L.P. system, i.e., L.P. turbine and compressor, is allowed to speed up, so that the engine is converted from a by-pass engine of low thrust to a composite pure jet engine of zero by-pass ratio which operates at a higher mass flow and higher overall pressure ratio. This type of engine is typified by FIGURE 3.

Such an engine has an application in a strike aircraft which requires sufficient thrust to achieve a Mach number of say 2.5 in the stratosphere and a high rate of acceleration through the transonic speed range together with a low thrust and minimum fuel consumption for a lower speed cruise condition. When the reheat equipment 21 is operative the area of the final nozzle of the engine will have to be varied but the variation will be less than that required to obtain the same thrust from a by-pass engine of the same by-pass ratio with reheat.

The engine has a further application to a VTO or STO aircraft in which air from the by-pass stream can be ducted to attitude control nozzles or to the flaps to give added lift. The air which would be bled off from the L.P. compressor at the high thrust mode of operation would be at higher pressure than in an ordinary by-pass engine when duct burning is in progress.

Such an engine would also have a useful application to a civil supersonic aircraft.

In this case the engine can be run at the supersonic cruise condition with duct burning to a temperature of say 1,100° K. and thus giving a performance approaching that of a pure jet engine.

At transonic speeds the duct burning temperature can be increased, either to speed up the L.P. compressor further or to raise the jet pipe pressure with a small reheat temperature rise, to give the additional thrust. Either case could give the extra thrust required without any final nozzle area variation. At stand-off the duct temperature can be reduced, for example, duct burning could cease altogether so that the engine works effectively as a by-pass engine at low thrust and good fuel consumption.

From (2) is derived an engine in which the L.P. compressor is prevented from speeding up by reducing the L.P. turbine pressure ratio by burning reheat fuel in the jet pipe, so that again the by-pass engine is converted into a composite pure jet engine of substantially the same mass flow with reheat and a fixed area final nozzle. The engine shown in FIGURE 2 would be more suited to such an application.

This aspect of having a fixed nozzle area which suits both the minimum thrust case, where reheat is employed, and the cruise case, when the engine is acting as a by-pass engine, is very important, since by eliminating the variation of final nozzle a considerable saving in weight can be achieved along with a reduction in the base drag of the engine.

Such an engine again has a useful application as a strike aircraft.

FIGURES 4 and 5 show the application of the invention to engines of high by-pass ratio, for example, by-pass ratios in the range 2 to 10. In these cases an engine of the type shown in FIGURE 3 is used as a means of providing a second or L.P. by-pass flow around the H.P. system.

The loss of efficiency due to compressing the air in the by-pass stream and then expanding it again through a turbine in the non-duct burning case, is lessened with the double by-pass cycle compared to the single by-pass case because, only a proportion of the by-pass air undergoes this inefficient cycle.

In FIGURE 4 there is shown an engine having an H.P. system comprising an H.P. compressor 100, an H.P. turbine 101 and combustion equipment 102, the turbine 101 being connected to the compressor 100 by an H.P. shaft 103.

A second compressor 104, referred to hereinafter as an I.P. compressor, produces a flow of air, one portion of which passes through the H.P. compressor 100 and the other portion of which passes down a duct 105 to a second or L.P. turbine 106. The I.P. compressor 104 is driven, partly in this example, by an I.P. or pressure balancing turbine 107 disposed downstream of the H.P. turbine 101, through an I.P. shaft 108. A second stage of the L.P. turbine 106 is drivingly connected to a compressor 109 by means of an L.P. shaft 110, and the first stage is connected to the I.P. shaft 108.

The compressor 109 is arranged to produce an air stream, one portion of which flows through the I.P. compressor 104 and the other portion of which flows through a second by-pass passage 111.

Second combustion equipment 112 is disposed in the inner or H.P. by-pass duct 105 and control means 113 are provided to enable the combustion equipment 112 to be made operative or non-operative as desired. The gases in the duct 105 and from the H.P. system are allowed to mix at 120 before passing through nozzle guide vanes 114 to the turbine 106. From the turbine 106 the said mixed gases pass down the engine jet pipe 115 and out to the atmosphere through a final nozzle (not shown).

Again nozzle guide vanes 114 are provided of which the trailing edge portions 114b are made to be variable angle vanes and the leading edge portions 114a support the rear bearing assembly. Reheat equipment 116 is provided in the jet pipe 115.

In FIGURE 5 there is shown an engine similar to the one shown in FIGURE 4 and therefore similar parts have been given similar reference numbers. The by-pass ratio in this case would generally be larger than in an engine of the type shown in FIGURE 4.

An H.P. compressor 100 is drivingly connected to an H.P. turbine 101 by shaft 103 and combustion equipment 102 is disposed between the two. In this embodiment all of the air compressed by the I.P. compressor 104 passes through the H.P. compressor and the air passing down the H.P. by-pass duct 105 is provided by the L.P. compressor 109 which thus becomes the second compressor means as called for in the claims. Both the L.P. compressor and the I.P. compressor are driven from an I.P. turbine 107, disposed downstream of the H.P. turbine 101 through an I.P. shaft 108.

In this embodiment the second turbine means 106 drives a nought stage 120 of the L.P. compressor the blades of which are extended through the engine casing to form a fan 121 within a short duct 122.

The driving connection between the turbine 106 and the fan 121 is made by means of an L.P. shaft 110.

In place of variable nozzle guide vanes 114 of FIGURE 4 the engine of FIGURE 5 is shown having means 123 for varying the angles of the stator vanes 124 of the compressor 109.

The mode of operation of the engines shown in FIGURES 4 and 5 is as follows.

When burning takes place only in the combustion equipment 102 the engine acts as an egine of high effective by-pass ratio with a low pressure ratio across the L.P. compressor.

When burning takes place in the duct 105 simultaneously with burning in the combustion equipment 102 the effective by-pass ratio of the engine is reduced and the engine thrust increases.

In the embodiment of FIGURE 4, the angle of the nozzle guide vanes can be varied so that the work done in the turbine 106 does not change and therefore the pressure in the jet pipe 115 is increased. By employing the reheat equipment 116 in the jet pipe the variation of the engine final nozzle area can be kept to a minimum and possibly eliminated. Also by having one stage of the L.P. turbine 106 drivingly connected to the second compressor, the second compressor can be arranged to speed up during duct burning to increase the pressure in the duct 105.

In the embodiment of FIGURE 5 the angle of the stator vanes of the L.P. compressor may be varied so that the mass flow through the L.P. compressor and the pressure ratio across said compressor can be increased and the entire thrust can be gained with a minimum variation of final nozzle area.

Because of the low inherent losses of efficiency of this double by-pass cycle as compared with the single by-pass cycle these engines have applications where low fuel consumption at low thrust is of first importance. An engine working on this cycle will therefore be of use in a maritime reconnaissance aircraft for example, where it is necessary for the aircraft to cruise out to a search area at high speed with the fuel consumption of a low by-pass ratio engine, and then to carry out a search at low speed and low thrust, for which period the low fuel consumption of a high by-pass ratio engine is needed.

These two conditions can be fulfilled to a good approximation by burning in the by-pass duct 105 for the high speed, high thrust part of the operation, during which time the effective by-pass ratio of the engine is low, and then to switch off the by-pass burners 112 to increase the effective by-pass ratio of the engine. As can be seen from FIGURE 1 the higher the by-pass ratio can be made the greater is the saving in fuel consumption at the low thrust point compared with the low by-pass ratio engine.

A further application of this type of engine is in a subsonic civil aircraft. In this application the H.P. by-pass flow in the duct 105 can be kept low so that only a small proportion of the total by-pass flow undergoes the inefficient compression and expansion when duct burning is not used, i.e., during cruise.

The large effective by-pass ratio during this cruise condition gives good fuel consumption at the low thrust condition required for a subsonic aircraft and yet the duct burning can increase the thrust sufficiently to give a thrust boost for take off on a hot day or to cover an engine failure.

Turning now to FIGURES 6 and 7 there are shown diagrammatically two examples of a further development of this invention.

In both the figures there is shown a pair of engines 201 each engine being of the by-pass type having an H.P. system, a further compressor upstream of the H.P. compressor of the H.P. system at least part of the airflow produced by said further compressor bypassing said H.P. system in the usual manner.

Further combustion equipment is, however, provided in the by-pass stream and control means are also provided for controlling the operation of said combustion equipment and the engines may incorporate either the variable nozzle guide vanes or variable compressor stator vanes as hereinbefore described with relation to FIGURES 2 to 5.

In FIGURE 6 the gases from the outlet of the engines 201 are ducted in separate ducts 202 to turbines 203 and 204 which are mounted coaxially on a shaft 206 and driving a fan 205.

In FIGURE 7 the exhaust gases from the engines 201 are ducted to a turbine 202 which is drivingly connected to a fan 203 by a shaft 204.

In this case the two engines 201 can be arranged to produce the same power as a single engine mounted concentrically with the L.P. shaft 104. This avoids the difficulties associated with very high pressure ratio engines, when the hub-tip ratio of the H.P. compressor becomes very high.

Another useful feature of the arrangement of FIGURE 6 is that the effective by-pass ratio of the engine as a whole may be varied by burning fuel in the H.P. by-pass ducts of each engine, and may then be further varied by shutting one engine down altogether whilst the aircraft is cruising.

The invention may be applied to VTO aircraft with engines of the swivelling nozzle type in which the by-pass air is directed through front swivelling nozzles and the mixed exhaust gases from the H.P. system are directed through rear swivelling nozzles. Alternatively the swivelling nozzles may be replaced by fans for VTO.

FIGURE 8 shows a typical engine configuration having an H.P. system comprising H.P. compressor 300, combustion enquipment 301, H.P. turbine 302 drivingly connected to the H.P. compressor, by means of a shaft 303, a second compressor 304 arranged to pass a portion of the mass flow therethrough to the H.P. compressor, a second turbine 305 and ducting 306 arranged to convey the remaining portion of the air compressed by the compressor 304 to the turbine 305, the said turbine 305 being drivingly connected to the compressor 304 by means of a shaft 307.

The gases from the H.P. turbine mix with those from the duct 306 in the turbine 305 and then are passed out to atmosphere through a pair of swivelling nozzles or fans 308 at the rear of the engine.

The turbine 305 also drives by means of shaft 307 a low pressure compressor 309 which produces an air stream a portion of which passes through the compressor 304 the remaining portion of which passes to atmosphere through a pair of swivelling nozzles or fans 310 at the front of the engine.

Combustion equipment 311 is disposed in the duct 306 and control means is provided for making the combustion equipment operative or non-operative as desired.

When the combustion equipment 311 is operative i.e. in the take-off condition, the engine works effectively as a low by-pass ratio engine.

When the combustion equipment is non-operative the engine works at low thrust as an effective high by-pass ratio engine with the considerable saving in fuel consumption as shown in FIGURE 1.

A further advantage of a double by-pass type of engine is that air can be bled off from the H.P. by-pass stream at higher pressure for attitude control as for high lift devices, for example, blown flaps.

Although the examples illustrated have been shown to have two or more shafts between the engine compressors and turbine this is not meant to preclude the adaptation of the present invention to use on a single shaft engine.

The FIGURES 2 to 8 must be taken as examples only of the many variations and adaptations of this invention, and the basic engine types are in no way meant to be limited to the features of design shown in particular figures relating thereto.

I claim:

1. A by-pass gas turbine engine having a high pressure system comprising in flow series a first compressor means, first combustion equipment and a first turbine means drivingly connected to the first compressor means, second compressor means, and second turbine means disposed downstream of the first turbine means, said second turbine means being drivingly connected to a compressor means of the engine, at least a portion of said second turbine means being in flow series with the first turbine means, ducting to convey at least a portion of the air compressed by the second compressor means to the second turbine means without passing through the high pressure system, nozzle guide vanes disposed upstream of the second turbine means, means for varying the vane angles of the nozzle guide vanes, second combustion equipment disposed in the said ducting to enable fuel to be burned in said portion of the air before it is mixed with the hot gases from the H.P. system, and control means whereby the further combustion means may be selected to be operative or non-operative thereby varying the effective by-pass ratio of the engine.

2. A by-pass gas turbine engine according to claim 1 and in which a driving connection is made between the said second compressor means and the second turbine means.

3. A by-pass gas turbine engine according to claim 1 and in which part of the second compressor means is in flow series with the high pressure system.

4. A by-pass gas turbine engine according to claim 1 and in which the ducting which conveys air between the second compressor and the second turbine is annular and surrounds the H.P. system.

5. A by-pass gas turbine engine according to claim 1 and comprising means mounting the second turbine in flow series with the first turbine, said second turbine having blades which extend into said ducting and into the flow path of the air therein.

6. A by-pass gas turbine according to claim 5 and in which splitter means are provided in the second turbine to maintain the gases in the said ducting passing through the extended blade portions of the second turbine in a stream separate from the stream of gases emerging from the H.P. system.

7. A by-pass gas turbine engine according to claim 1 comprising means mounting a pressure balancing turbine in the path of the gases emerging from the first turbine.

8. A by-pass gas turbine engine according to claim 1 having a further compressor means, and a driving connection between said further compressor means and a turbine of the engine, said further compressor means providing a second or L.P. by-pass stream which does not pass through the H.P. system.

9. A by-pass gas turbine engine according to claim 8 and in which a driving connection is made between the further compressor means and the second turbine means.

10. A by-pass gas turbine engine according to claim 8 and in which the further compressor means comprises an L.P. compressor and means are provided for mounting the L.P. compressor upstream of the second compressor whereby at least part of the L.P. compressor is in flow series with the second compressor.

11. A by-pass gas turbine engine according to claim 8 and comprising a duct which surrounds the engine for at least a portion of the axial length of the engine, the further compressor means being in the form of a fan disposed within said duct.

12. A by-pass gas turbine engine according to claim 11 and in which the rotor blades of the fan comprise extensions of the rotor blades of one or more stages of one of the engine compressors.

13. A by-pass gas turbine engine according to claim 1 and in which means are provided for varying the angles of the stator vanes in the second compressor.

14. A by-pass gas turbine engine according to claim 1 and wherein combustion equipment is disposed in the engine jet pipe for afterburning.

15. A by-pass gas turbine engine according to claim 1 and wherein an engine final nozzle is provided, the area of which is fixed.

16. A by-pass gas turbine engine as claimed in claim 8 and in which swivelling nozzles are provided on the engine and the second by-pass stream is directed thereto.

17. A by-pass gas turbine engine according to claim 17 and in which a further pair of swivelling nozzles are provided to which the gas stream emerging from the second turbine is directed.

18. A by-pass gas turbine engine according to claim 1 in which there is provided a pair of H.P. systems, third turbine means in flow series therewith and a further compressor means drivingly connected with the third turbine means.

19. A by-pass gas turbine engine having a high pressure system comprising in flow series a first compressor means, first combustion equipment and a first turbine means drivingly connected to the first compressor means, second compressor means, and second turbine means disposed downstream of the first turbine means, said second turbine means being drivingly connected to a compressor means of the engine, at least a portion of said second turbine means being in flow series with said first turbine means, ducting to convey at least a portion of the air compressed by the second compressor means to the second turbine means without passing through the high pressure system, means mounting the second turbine means in flow series with the first turbine means, said second turbine means having blades extending into said ducting and into the flow path of the air therein, splitter means provided in the second turbine means to maintain the gases in said ducting passing through the extended blade portions of the second turbine means in a stream separate from the stream of gases emerging from the H.P. system, second combustion equipment disposed in the said ducting to enable fuel to be burned in said portion of the air before it is mixed with the hot gases from the H.P. system, and control means whereby the further combustion means may be selected to be operative or non-operative thereby varying the effective by-pass ratio of the engine.

20. A by-pass gas turbine engine having a high pressure system comprising in flow series a first compressor means, first combustion equipment and a first turbine means drivingly connected to the first compressor means, second compressor means having stator vanes and rotor vanes, means provided for varying the angles of the stator vanes in the second compressor, second turbine means disposed downstream of the first turbine means, said second turbine means being drivingly connected to a compressor means of the engine, at least a portion of said second turbine means being in flow series with the first turbine means, ducting to convey at least a portion of the air compressed by the second compressor means to the second turbine means without passing through the high pressure system, second combustion equipment disposed in the said ducting to enable fuel to be burned in said portion of the air before it is mixed with the hot gases from the H.P. system, and control means whereby the further combustion means may be selected to be operative or non-operative thereby varying the effective by-pass ratio of the engine.

References Cited

UNITED STATES PATENTS

| 3,016,698 | 1/1962 | Sobey | 60—262 |
| 3,153,906 | 10/1964 | Marchant | 60—226 |

FOREIGN PATENTS

| 1,264,988 | 5/1961 | France. |
| 1,081,277 | 5/1960 | Germany. |
| 625,802 | 7/1949 | Great Britain. |

CARLTON R. CROYLE, *Primary Examiner.*

MARK M. NEWMAN, *Examiner.*

D. HART, *Assistant Examiner.*